United States Patent [19]

Meyer

[11] Patent Number: 4,999,213
[45] Date of Patent: Mar. 12, 1991

[54] MONOFUNCTIONAL ALCOHOLS TO PREVENT GELATION IN TWO COMPONENT ISOCYANATE COATINGS

[75] Inventor: Walter C. Meyer, Rochester Hills, Mich.

[73] Assignee: E. I. Du Pont de Nemours and Company, Wilmington, Del.

[21] Appl. No.: 482,751

[22] Filed: Feb. 21, 1990

[51] Int. Cl.$^5$ .......................... B05D 1/04; B05D 1/06; B05D 1/34; B05D 1/36
[52] U.S. Cl. ...................................... 427/27; 427/426; 428/423.1; 528/49
[58] Field of Search ..................... 427/27, 426; 528/75, 528/49; 428/423.1

[56] References Cited

U.S. PATENT DOCUMENTS

| | | | |
|---|---|---|---|
| 3,307,789 | 3/1967 | Clark | 427/426 X |
| 3,558,564 | 1/1971 | Vasta | 528/75 X |
| 3,912,680 | 10/1975 | Oertel et al. | 260/29.2 TN |
| 4,020,216 | 4/1977 | Miller | 528/75 X |
| 4,056,403 | 11/1977 | Cramer et al. | 134/22 R |
| 4,098,772 | 7/1978 | Bonk et al. | 528/49 |
| 4,195,169 | 3/1980 | Priddy | 528/500 |
| 4,208,495 | 6/1980 | Chang et al. | 525/440 |
| 4,235,766 | 11/1980 | Kuijper | 260/33.4 U R |
| 4,409,380 | 10/1983 | Holubka | 528/45 |
| 4,410,678 | 10/1983 | Holubka et al. | 528/45 |
| 4,410,679 | 10/1983 | Holubka et al. | 528/45 |
| 4,460,126 | 7/1984 | Gates et al. | 239/112 |
| 4,480,081 | 10/1984 | Rosin et al. | 528/49 |
| 4,485,840 | 12/1984 | Erwin | 137/240 |
| 4,534,802 | 8/1985 | Gates et al. | 134/22.12 |
| 4,554,188 | 11/1985 | Holubka et al. | 427/393.5 |
| 4,559,383 | 12/1985 | Holubka et al. | 524/542 |
| 4,659,770 | 4/1987 | Vasta | 524/553 |
| 4,711,929 | 12/1987 | Stamegna et al. | 525/131 |

FOREIGN PATENT DOCUMENTS

| | | |
|---|---|---|
| 132675 | 10/1978 | Fed. Rep. of Germany . |
| 2819577 | 11/1979 | Fed. Rep. of Germany . |
| 3523971 | 1/1987 | Fed. Rep. of Germany . |
| 3639637 | 5/1988 | Fed. Rep. of Germany . |
| 52-147636 | 12/1977 | Japan . |
| 53-117043 | 10/1978 | Japan . |
| 56-070019 | 6/1981 | Japan . |
| 60-192773 | 10/1985 | Japan . |
| 61-133242 | 6/1986 | Japan . |
| 1458564 | 12/1976 | United Kingdom . |
| 1547235 | 6/1979 | United Kingdom . |
| 2066258 | 5/1983 | United Kingdom . |

Primary Examiner—Michael Lusignan
Attorney, Agent, or Firm—Hilmar L. Fricke

[57] ABSTRACT

An improved process for applying a two component polyurethane coating composition to a substrate; a stream of a polyol having reactive hydroxyl groups is mixed with a stream of an organic polyisocyanate crosslinking agent to form a blend that is applied to the substrate; the improvement used in this process is as follows:

adding to the stream of polyol a monohydric primary or secondary alcohol in a ratio of about 0.5–2.0 equivalents of alcohol hydroxyl to polyol hydroxyl before mixing with the stream of organic polyisocyanate and before application to the substrate to prevent or substantially reduce the formation of gel particles;

wherein the monohydric primary or secondary alcohol has a 90% evaporation rate at 25° C. of less than 10,000 seconds as determined by ASTM D3539 using an Automatic Shell Thin Film Evaporator.

13 Claims, No Drawings

MONOFUNCTIONAL ALCOHOLS TO PREVENT GELATION IN TWO COMPONENT ISOCYANATE COATINGS

BACKGROUND OF THE INVENTION

This invention is related to a process for the the application of two component polyurethane coatings and in particular to the prevention or substantial reduction of gelation in the process.

Two component polyurethane coatings are well known in the art as shown in Vasta U.S. Pat. No. 3,558,564 issued Jan. 26, 1971 and Miller U.S. Pat. No. 4,020,216 issued Apr. 26, 1977. However, there continues to be problem with formation of gel particles in equipment when streams of the two components i.e., of polyol and isocyanate are mixed before application. In a typical paint spray application line, a stream of polyol and a stream of isocyanate are mixed in an in-line mixer just before application. Under ideal conditions this mixed stream flows promptly and cleanly through the paint spray application equipment before any reaction occurs between the polyol and isocyanate. However, any stoppage of application of the paint as often occurs or a breakdown of the equipment results in the formation of soft and hard gel particles in the application equipment.

Most application equipment has small static or dead areas where small gel particles form. Under the worst conditions, complete gelation of the paint can occur which would require extensive down time for cleaning of the equipment or replacement of parts of the equipment. At the least, small gel particles interfere with the atomization of the paint, clog filters or show in the resulting finish as defects in the finish.

There is a need for an improvement in the application of two component polyurethanes that would eliminate or substantially eliminate formation of gel particles.

SUMMARY OF THE INVENTION

In a process for applying a two component polyurethane coating composition by mixing a stream of a polyol having reactive hydroxyl groups with a stream of an organic polyisocyanate crosslinking agent before application of the composition to a substrate, the improvement used therewith comprises adding a monohydric primary or secondary alcohol to the polyol stream in a ratio of about 0.5-2.0 equivalents of alcohol hydroxyl to polyol hydroxyl before mixing with the stream of organic polyisocyanate and before application to the substrate to prevent or substantially reduce the formation of gel particles;

wherein the monohydric primary or secondary alcohol has a 90% evaporation rate at 25° C. of less than 10,000 seconds as determined by ASTM D3539 using an Automatic Shell Thin Film Evaporator.

DETAILED DESCRIPTION OF THE INVENTION

In a conventional process for applying a two component polyurethane coating composition, a stream of a polyol having reactive hydroxyl groups is blended with a stream of polyisocyanate crosslinking agent usually with the aid of an in-line mixer just before the coating composition is applied to a substrate. After application, the hydroxyl groups of the polyol react with the polyisocyanate and crosslink on curing to form a polyurethane finish. As soon as the two streams are combined, some reaction takes place and gel particles can be formed in the mixing and application equipment which can clog the equipment and/or form imperfections in the resulting polyurethane finish.

In the improved process of this invention, a monohydric primary or secondary alcohol is incorporated in the polyol stream before it is mixed with the stream of organic polyisocyanate and before application to the substrate. About 0.5-2.0 equivalents of alcohol hydroxyl to 1 equivalent of polyol hydroxyl are used.

The following are preferred operating conditions:

(A) If the polyol mainly contains primary hydroxyl groups and the alcohol used is a primary monofunctional alcohol, this alcohol is added in a ratio of 0.7-1.8 equivalents of alcohol hydroxyl to polyol primary hydroxyl;

(B) If the polyol mainly contains primary hydroxyl groups and the alcohol used is a secondary monofunctional alcohol, this alcohol is added in a ratio of about 1.0-2.0 equivalents of alcohol hydroxyl to polyol primary hydroxyl;

(C) If the polyol mainly contains secondary hydroxyl groups and the alcohol is a primary monofunctional alcohol, this alcohol is added in a ratio of about 0.2-1.6 equivalents of alcohol hydroxyl to polyol secondary hydroxyl groups;

(D) If the polyol mainly contains secondary hydroxyl groups and the alcohol used is a secondary alcohol, this alcohol is added in a ratio of about 0.9-1.8 equivalents of alcohol hydroxyl to polyol secondary hydroxyl.

In any of the above (A) through (D), a mixture of primary and secondary alcohols can be used in the above equivalents ratios.

In a typical spraying application, air pressure of 50 to 80 pounds per square inch gauge (psig) is used and paint flow rates are used to provide a dried film thickness of about 1.2-2.5 mils which is generally used for automotive applications.

Typical spray application equipment used in the process of this invention include DeVilbiss JGA or AGB or Binks Models 61 or 62 air atomization spray guns. Air atomized electrostatic spray equipment can also be used such as, SAMES 402 dual head spray guns, DeVilbiss RME or Ransburg REA spray guns. Typical voltages used for electrostatic spray guns are 60-90 kilovolts and air pressures of about 10-40 psig. Paint flow rates are set to provide the desired dried paint film thickness.

Rotary bells can be used to apply paints by the process of this invention. Typically useful rotary bells are Behr ESTA Bell Rotary Atomizer and Ransburg GEMA Turbo Bells. These bells are operated at about 60-90 kilovolts and 20-40,000 RPM (revolutions per minute).

Metering equipment is positioned before the spray equipment to meter and mix polyol and diisocyante in the proper ratio before entering the spray equipment. Suitable equipment is as follows: Grayco "Hydrocat" dual piston meter mixing equipment, Behr two component meter/mix system or DeVilbiss 2K system.

Usually the film forming binder of the coating composition contains about 60-90% by weight of the hydroxy polyol and about 10-40% by weight of an organic polyisocyanate crosslinking agent.

Typical hydroxyl polyols that can be used in the coating composition are acrylic polyols, polyether polyols, polyesterpolyols and polyesterurethane polyols.

Typical acrylic polyols are formed by polymerizing alkyl acrylates and methacrylates and other polymerizable ethylenically unsaturated monomers such as styrene and a hydroxyl alkyl acrylate or methacrylate. Examples of such polyols are styrene/isobutyl methacrylate/hydroxypropyl acrylate; styrene/butyl methacrylate /hydroxyethyl acrylate; butyl methacrylate/hydroxypropyl acrylate; methyl methacrylate/hydroxyethyl acrylate/styrene/butyl acrylate. Other useful acrylic polyols are shown in Miller U.S. Pat. No. 4,020,216 issued Apr. 26, 1977 and Vasta U.S. Pat. No. 3,558,564 issued Jan. 25, 1971 which are hereby incorporated by reference.

Typical polyesterpolyols can be formed by reacting a dicarboxylic acid with a diol in a molar ratio of about 1:2. An acid terminated polyester can be formed and then further reacted with a diol or polyol to form a polyesterpolyol. Hydroxy functional polyesters can be used which are the reaction product of a diol of the formula HOROH where R is an aliphatic, cycloaliphatic, or aromatic hydrocarbon radical that has 2-6 carbon atoms and a dicarboxylic acid of the formula $R^1(COOH)_2$ or an anhydride of such an acid where $R^1$ is an aliphatic, cycloaliphatic, or aromatic hydrocarbon radical having 6-12 carbon atoms.

The hydroxy functional polyesters are formed by conventional techniques in which the diol and acid are charged into a conventional polymerization vessel and reacted at about 150°-240° C. for about 12-18 hours. Optionally, an esterification catalyst is used to decrease the reaction time. About 1.2-1.4 equivalents of diol are used with 1 equivalent of acid and preferably, about 1.2-1.3 equivalents of diol with 1 equivalent of acid are used. To insure the formation of a hydroxy functional polyester, an excess of diol is used.

Typical polyesterurethanes polyols are formed by reacting a hydroxy terminated polyester with an organic diisocyanate in a molar ratio of about 2:1.

A typically useful polyesterurethane is the reaction product of a hydroxy functional polyester which may contain residual carboxy functional groups and an organic polyisocyanate. To form such a polyesterurethane, about 60-90% weight percent, based on the weight of the polyesterurethane, of a hydroxy functional polyester, 10-40% by weight of an organic polyisocyanate are reacted at about 70°-95° C. for about 8-15 hours using conventional solvents and catalysts. Preferably, about 10-30% by weight of a difunctional isocyanate and 0-20% by weight of a trifunctional isocyanate are used.

Typical diols and triols that are used to form the above polyester and the polyesterurethane are butane diol, hexane diol, cyclohexane dimethanol, ethylene glycol, neopentyl glycol, trimethylol propane or mixtures of any of the above.

Typical acids that are used to form the above polyester and the polyesterurethane are adipic acid, azelaic acid, sebasic acid, dodecane dicarboxylic acid and hexahydrophthalic acid, phthalic acid, terephthalic acid, isophthalic acid, or anhydrides of any of these acids.

The organic diisocyanates are those that are typically used in coating compositions and are shown in the aforementioned Miller and Vasta Patents.

Typical diisocyanates that can be used include aliphatic, aromatic or cycloaliphatic diisocyanates such as 1,6-hexamethylene diisocyanate, isophorone diisocyanate, 4,4'-biphenylene diisocyanate, toluene diisocyanate, bis cyclohexyl diisocyanate, tetramethyl xylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether, and the like.

Trifunctional isocyanate also can be used such as triphenylmethane triisocyanate, 1,3,5-benzene triisocyanate, 2,4,6-toluene triisocyanate, an adduct of trimethylol propane and tetramethyl xylene diisocyanate sold under the tradename "Cythane 3160", "Desmodur" N 3390 which is the trimer of hexamethylene diisocyanate, IPDI Trimer T-1890 which is the trimer of isophorone diisocyanate and the like. The preferred triisocyanate is the trimer of hexamethylene diisocyanate.

The monohydric primary and secondary alcohols that are added to the coating composition to reduce gelation have a 90% evaporation rate of less than 10,000 seconds as determined in a Shell Thin Film Evaporator at 25° C. Typically useful alcohols are for example methanol, ethanol, isopropanol, n-propanol, sec-butanol, iso-butanol, n-butanol, methyl amyl alcohol, 2-methyl-1-butanol, cyclohexanol and mixtures of any of the above.

Glycol ethers can be used in the place of the primary and secondary alcohols in the process of this invention using the hydroxyl equivalents as used with the alcohols.

Typically useful glycol ethers are propylene glycol monomethyl ether, ethylene glycol monomethyl ether, ethylene glycol monoethyl ether, propylene glycol t-butyl ether, ethylene glycol monopropyl ether, propylene glycol monopropyl ether, propylene glycol isobutyl ether, propylene glycol monobutyl ether and ethylene glycol monobutyl ether.

If the coating composition is used as a conventional pigmented monocoat coating composition or as the basecoat of a clear coat/basecoat composition, the composition contains pigments in a pigment to binder weight ratio of about 1:100-200:100. It may be advantageous to use ultraviolet stabilizers and/or screeners in the pigmented composition.

Any of the conventional pigments used in coating compositions can be utilized such as the following: metallic oxides, such as titanium dioxide, zinc oxide, iron oxide and the like, metal hydroxide, metal flakes such as aluminum flake, chromates, sulfides, sulfates, carbonates, carbon black, silica, talc, china clay, phthalocyanine blues and greens, organo reds, organo maroons and other organic pigments and dyes.

The following example illustrates the invention. All parts and percentages are on a weight basis unless indicated otherwise.

EXAMPLE

An acrylic polyol A is prepared by charging the following constituents into a polymerization vessel equipped with a stirrer, a reflux condenser, an addition funnel and a heating mantle:

| | PARTS BY WEIGHT |
|---|---|
| Portion 1 | |
| "Aromatic 100" -aromatic solvent | 1800 |
| Xylene | 325 |
| Portion 2 | |
| Styrene monomer | 1250 |
| Isobutyl methacrylate monomer | 2000 |
| Hydroxy propyl methacrylate monomer | 1750 |
| "Aromatic 100" | 300 |
| t-Butyl peracetate | 200 |
| Portion 3 | |
| Xylene | 900 |
| Total | 7625 |

Portion 1 was charged into the polymerization vessel and heated to its reflux temperature of about 150° C. Portion 2 was mixed and then fed into the polymerization vessel over a 5 hour period at a uniform rate while maintaining the resulting reaction mixture at its reflux temperature and then held at this temperature for an additional 30 minutes. The reaction mixture was cooled and then Portion 3 was added.

The resulting acrylic polyol solution has a Gardner-Holdt viscosity of about "U" measured at 25° C. and a solids content of about 60%.

Acrylic polyol solution B was prepared by charging the following constituents into a polymerization vessel equipped as above:

| | PARTS BY WEIGHT |
|---|---|
| Portion 1 | |
| "Aromatic 100" | 1945 |
| PM acetate | 756 |
| Portion 2 | |
| Styrene monomer | 1350 |
| Butyl methacrylate monomer | 2322 |
| Hydroxy ethyl acrylate monomer | 1788 |
| PM acetate | 231 |
| t-Butyl peracetate | 231 |
| Portion 3 | |
| PM acetate | 12 |
| t-Butyl peracetate | 12 |
| Total | 8647 |

Protion 1 was charged into the polymerization vessel and heated to its reflux temperature of about 155° C. Portion 2 was fed into the polymerization vessel over a 5 hour period at a uniform rate while maintaining the resulting reaction mixture at its reflux temperature and then held at this temperature for an additional 30 minutes. Then Portion 3 was added and the mixture was held at its reflux temperature for an additional 30 minutes.

The resulting acrylic polyol solution has a Gardner-Holdt viscosity of about "X-Y" measured at 25° C. and a solids content of about 65%.

A coating composition was prepared by blending together the following constituents:

| Control A | PARTS BY WEIGHT |
|---|---|
| Acrylic polyol solution B (prepared above) | 225.0 |
| Butyl acetate | 60.0 |
| Polyisocyanate solution (72% solids of "Desmodur" 33100 - trimer of hexamethlylene diisocyanate in butyl acetate/aromatic hydrocarbon solvent blend) | 105.0 |

| Control A -continued | PARTS BY WEIGHT |
|---|---|
| Total | 390.0 |

Coating compositions 1-5 were formulated using the above constituents except that a portion of the butyl acetate solvent was replaced with n-butanol. The following changes were made:

| Equivalents Alcohol Hydroxyl | | Weight Ratio of n-Butanol/ Butyl Acetate |
|---|---|---|
| 0.25 | Coating composition 1 | 7.5/52.5 |
| 0.50 | Coating composition 2 | 15/45 |
| 0.75 | Coating composition 3 | 22.5/37.5 |
| 1.00 | Coating composition 4 | 30/30 |
| 1.50 | Coating composition 5 | 45/15 |

Coating compositions which were very similar in composition to Control Coating Composition A and did not contain n-butanol used for gel reduction in the composition were sprayed from a conventional commercial electrostatic spray gun (dual head Sames 402 electrostatic spray gun) used in the automotive industry to spray automobile bodies on a paint line for a 2 week period. The spray gun and the associated equipment (Behr 2K meter mixing equipment) were removed, examined and cleaned. A noticeable amount of gelled paint was found in the gun and the associated equipment.

Above coating composition 4 which did contain n-butanol was sprayed for the same period of time and the spray gun and associated equipment were removed, examined and cleaned as above. Composition 4 showed no gel formation in the gun and related equipment. There was a sufficient amount of n-butanol in the composition to prevent gel formation.

Similar results can be expected with compositions 2,3 and 5.

To illustrate that the n-butanol significantly reduces gelation, the above control coating composition and coating compositions 1-5 were allowed to stand at room temperature and the Brookfield viscosity of each was measured after 1 hour, 3.5 hours, 2, 3, 4, 7, 9, 10, 14, 17 and 24 days, respectively. The results are shown in Table 1. The Control A which did not contain n-butanol after 7 days formed hard gel as did Coating composition 1 which did not contain sufficient amount of butanol. Composition 2 formed a soft gel after 7 days and Compositions 3-5 which had a butanol content well within the range of this invention did not gel after 24 days.

A coating composition was prepared by blending together the following constituents:

| Control B | PARTS BY WEIGHT |
|---|---|
| Acrylic polyol solution B (prepared above) | 225.0 |
| Butyl acetate | 60.0 |
| Polyisocyanate solution (described above) | 105.0 |
| Total | 390.0 |

Coating compositions 6-11 were formulated using the above constituents except that a portion of the butyl acetate solvent was replaced with sec-butanol. The following changes were made:

| Equivalents of Hydroxy Alcohol | | Weight Ratio of sec-Butanol/ Butyl Acetate |
|---|---|---|
| 0.25 | Coating composition 6 | 7.5/52.5 |
| 0.50 | Coating composition 7 | 15/45 |
| 0.75 | Coating composition 8 | 22.5/37.5 |
| 1.00 | Coating composition 9 | 30/30 |
| 1.50 | Coating composition 10 | 45/15 |
| 2.00 | Coating composition 11 | 60/0 |

To illustrate the that sec-butanol significantly reduces gelation, the above control coating composition B and coating compositions 6-11 were allowed to stand at room temperature and the Brookfield viscosity of each was measured after 1 hour, 3.5 hours, 2, 3, 4, 7, 9, 10, 14, 17 and 24 days, respectively. The results are shown in Table 1. The Control B which did not contain n-butanol after 7 days formed hard gel as did Coating composition 6 which did not contain sufficient amount of butanol. Compositions 7 and 8 formed soft gel after 7 and 9 days respectively and Compositions 9-11 which had a butanol content well within the range of this invention did not gel after 24 days.

A coating composition was prepared by blending together the following constituents:

| Control C | PARTS BY WEIGHT |
|---|---|
| Acrylic polyol solution A (prepared above) | 225.0 |
| Butyl acetate | 60.0 |
| Polyisocyanate solution (described above) | 105.0 |
| Total | 390.0 |

Coating compositions 12-17 were formulated using the above constituents except that a portion of the butyl acetate solvent was replaced with sec-butanol. The following changes were made:

| Equivalents of Hydroxy Alcohol | | Weight Ratio of sec-Butanol/ Butyl Acetate |
|---|---|---|
| 0.25 | Coating composition 12 | 7.5/52.5 |
| 0.50 | Coating composition 13 | 15/45 |
| 0.75 | Coating composition 14 | 22.5/37.5 |
| 1.00 | Coating composition 15 | 30/30 |
| 1.50 | Coating composition 16 | 45/15 |
| 2.00 | Coating composition 17 | 60/0 |

To illustrate the that sec-butanol significantly reduces gelation, the above control coating composition C and coating compositions 12-17 were allowed to stand at room temperature and the Brookfield viscosity of each was measured after 1 hour, 3.5 hours, 2, 3, 4, 7, 9, 10, 14, 17 and 24 days, respectively. The results are shown in Table 1. The Control C which did not contain n-butanol after 7 days formed hard gel. Coating composition 12 which did not contain sufficient amount of butanol formed a soft gel after 7 days. Composition 13 formed a very soft gel after 10 days and Compositions 14-17 which had a butanol content well within the range of this invention did not gel after 24 days.

TABLE I

| | BROOKFIELD VISCOSITY | | | | | | |
|---|---|---|---|---|---|---|---|
| | 1 HR. | 3.5 HR. | DAY 2 | DAY 3 | DAY 4 | DAY 7 | DAY 9 |
| CONTROL A | 117.6 | 224 | 170 | 292 | 928 | HARD GEL | ** |
| 1 | 112.8 | 208 | 176 | 332 | 784 | HARD GEL | ** |
| 2 | 114.4 | 224 | 192 | 372 | 728 | SOFT GEL | ** |
| 3 | 109.6 | 208 | 202 | 384 | 680 | 1692 | 2432 |
| 4 | 112.2 | 208 | 218 | 432 | 704 | 1174 | 1256 |
| 5 | 109.6 | 224 | 236 | 448 | 616 | 753 | 746 |
| CONTROL B | 116 | 240 | 164 | 288 | 928 | HARD GEL | ** |
| 6 | 111.2 | 192 | 164 | 292 | 712 | HARD GEL | ** |
| 7 | 103.2 | 192 | 154 | 276 | 568 | SOFT GEL | ** |
| 8 | 113.6 | 224 | 170 | 316 | 616 | 9860 | SOFT GEL |
| 9 | 111.2 | 208 | 174 | 320 | 608 | 2025 | 3336 |
| 10 | 110.2 | 208 | 176 | 340 | 576 | 1150 | 1290 |
| 11 | 157.6 | 208 | 244 | 372 | 600 | 1116 | 1216 |
| CONTROL C | 70.4 | 112 | 92 | 136 | 256 | HARD GEL | ** |
| 12 | 68.8 | 128 | 96 | 156 | 264 | SOFT GEL | ** |
| 13 | 70.4 | 114 | 140 | 180 | 262 | 1050 | 5320 |
| 14 | 71.2 | 128 | 104 | 180 | 296 | 699 | 1002 |
| 15 | 70.4 | 112 | 108 | 184 | 304 | 528 | 616 |
| 16 | 70.4 | 128 | 116 | 200 | 280 | 452 | 474 |
| 17 | 68 | 128 | 108 | 200 | 264 | 415 | 422 |

| | BROOKFIELD VISCOSITY | | | |
|---|---|---|---|---|
| | DAY 10 | DAY 14 | DAY 17 | DAY 24 |
| CONTROL A | ** | ** | ** | ** |
| 1 | ** | ** | ** | ** |
| 2 | ** | ** | ** | ** |
| 3 | 2790 | 5384 | 4870 | 4625 |
| 4 | 1305 | 1415 | 1354 | 1294 |
| 5 | 758 | 800 | 750 | 722 |
| CONTROL B | ** | ** | ** | ** |
| 6 | ** | ** | ** | ** |
| 7 | ** | ** | ** | ** |
| 8 | ** | ** | ** | ** |
| 9 | 3990 | 6340 | 6820 | 7570 |
| 10 | 1340 | 1472 | 1436 | 1402 |
| 11 | 1216 | 1306 | 1220 | 1132 |

TABLE I-continued

| | | | | |
|---|---|---|---|---|
| CONTROL C | ** | ** | ** | ** |
| 12 | ** | ** | ** | ** |
| 13 | V.SOFT GEL | SOFT GEL | ** | ** |
| 14 | 1186 | 2085 | 2375 | 3110 |
| 15 | 666 | 804 | 779 | 746 |
| 16 | 488 | 502 | 476 | 490 |
| 17 | 430 | 456 | 430 | 440 |

**indicates experiment was terminated.

What is claimed is:

1. In a process for applying a two component polyurethane coating composition to a substrate by mixing a stream of a polyol having reactive hydroxyl groups with a stream of an organic polyisocyanate crosslinking agent to form a blend that is applied to the substrate, the improvement used therewith comprises adding to the stream of polyol before application a monohydric primary or secondary alcohol in a ratio of about 0.5–2.0 equivalents of alcohol hydroxyl to polyol hydroxyl before mixing with the stream of organic polyisocyanate and before application to the substrate to prevent or substantially reduce the formation of gel particles;

wherein the monohydric primary or secondary alcohol has a 90% evaporation rate at 25° C. of less than 10,000 seconds as determined by ASTM D3539 using an Automatic Shell Thin Film Evaporator.

2. The process of claim 1 in which the polyol mainly contains primary hydroxyl groups and the alcohol is a primary monofunctional alcohol added in a ratio of about 0.7–1.8 equivalents of alcohol to polyol hydroxyl.

3. The process of claim 1 in which the polyol mainly contains primary hydroxyl groups and the alcohol is a secondary monofunctional alcohol added in a ratio of about 1.0–2.0 equivalents of alcohol to polyol hydroxyl groups.

4. The process of claim 1 in which the polyol mainly contains secondary hydroxyl groups and the alcohol is a primary monofunctional alcohol added in a ratio of about 0.2–1.6 equivalents of alcohol to polyol hydroxyl groups.

5. The process of claim 1 in which the polyol mainly contains secondary hydroxyl groups and the alcohol is a secondary monofunctional alcohol added in a ratio of about 0.9–1.8 equivalents of alcohol to polyol hydroxyl groups.

6. The process of claims 2–5 in which a mixture of primary and secondary monofunctional alcohols is used.

7. The process of claim 1 in which the polyol is an acrylic polyol.

8. The process of claim 1 in which the polyol is a polyester polyol.

9. The process of claim 1 in which the polyol is a polyesterurethane polyol.

10. The process of claim 1 in which the polyol is a polyether polyol.

11. The process of claim 1 in which the alcohol is selected from the group consisting of methanol, ethanol, n-propanol, iso-propanol, sec-butanol, iso-butanol, n-butanol, methyl amyl alcohol, methyl butanol, cyclohexanol and any mixtures thereof.

12. The process of claim 1 in which a glycol ether is used in the place of the primary or secondary monofunctional alcohols.

13. The process of claim 12 in which the glycol ether is selected from the group consisting of propylene glycol monomethyl ether, ethylene glycol monomethyl ether, ethylene glycol monoethyl ether, propylene glycol t-butyl ether, ethylene glycol monopropyl ether, propylene glycol monopropyl ether, propylene glycol isobutyl ether, propylene glycol monobutyl ether, ethylene glycol monobutyl ether and any mixtures thereof.

* * * * *